United States Patent [19]

Volna

[11] 4,437,803
[45] Mar. 20, 1984

[54] SPINDLE SQUARING TOOL

[76] Inventor: William M. Volna, 1808 Quincy St. NE., Minneapolis, Minn. 55418

[21] Appl. No.: 376,565

[22] Filed: May 10, 1982

[51] Int. Cl.³ .......................... B23C 9/00; B23Q 17/16
[52] U.S. Cl. .................................... 409/218; 408/116; 33/185 R
[58] Field of Search ............ 33/172 D, 169 C, 174 Q, 33/185 R; 409/214, 218; 408/116, 75, 16

[56] References Cited

U.S. PATENT DOCUMENTS

| | | | |
|---|---|---|---|
| 2,860,418 | 11/1958 | Johnson | 33/172 D |
| 2,872,737 | 2/1959 | Muller | 33/172 D |
| 3,044,322 | 7/1962 | George | 33/185 |
| 3,785,058 | 1/1974 | Egli | 33/172 D |
| 3,914,869 | 10/1975 | Merz et al. | 33/172 D |
| 4,086,704 | 5/1978 | Masaichi | 33/172 D |
| 4,219,936 | 9/1980 | Bridges | 33/174 Q |

Primary Examiner—Z. R. Bilinsky
Assistant Examiner—Thomas M. Kline

[57] ABSTRACT

An instrument for aligning the spindle of a vertical milling machine perpendicular to the milling machine table or work surface. The instrument comprises a first right circular cylinder member that is coaxially attached to the machine spindle about a first axis. This is typically accomplished with the use of a spindle collet. A second pivotal member contains that portion of the first member protruding from the spindle collet. The second member allows rotational and axial freedom of the first member, and the first member is so contained that radial clearance between the first and second member is held to be negligible. The second member is constructed to provide for pivotal attachment to a third or main frame member about a second axis which is orthogonal but not necessarily coplanar with the first axis. The third member has provision for contact with the milling machine table at two points that define a third axis which is orthogonal but not necessarily coplanar with the second axis. A displacement indicator is affixed between the second and third members such that both acute and obtuse departures from perpendicularity between the first and third axes can be quantified.

11 Claims, 6 Drawing Figures

SPINDLE SQUARING TOOL

BACKGROUND OF THE INVENTION

The object of this invention is to provide a simple means of measuring and thereby adjusting an axis to be normal to a plane, such as the cutter spindle axis and table of a vertical milling machine. Whereas it might be assumed that the spindle of a vertical milling machine would be vertically fixed during its manufacture, this is not necessarily true. There are approximately one million vertical milling machines in the world with cutting spindles that are purposely made adjustable about two mutually orthogonal axes through large angles e.g. 45°. These machines are patterned after and functionally unchanged from a machine first introduced by the Bridgeport Milling Machine Co. in 1938. Although the dominant day to day use of a vertical milling machine occurs with the spindle axis normal to the work table (vertical), there are frequent machining operations in which it is far easier to incline the spindle through an angle than to incline the work piece. When the machining operations that require an inclined spindle are completed, it is then necessary to return the spindle to a vertical position. In the parlance of the machinist, this is called "sweeping or squaring the head". This process of squaring the head is difficult and time consuming for even the best machinist, due to a design characteristic of the two axes about which the spindle of a Bridgeport type machine is adjustable. A better understanding of the problem which said invention remedies can be had by reference to FIG. 1A. In FIG. 1A the work holding milling machine table 10 has defined motion along three mutually orthogonal axes 11, 12, and 13.

The spindle 14 which holds the cutter is mounted above the table. The axis of spindle rotation 15 is normal to the table 10 which gives rise to the name "vertical milling machine". In the Bridgeport type milling machine the spindle can be inclined with respect to the work table and then rigidly secured in an inclined position about two mutually orthogonal axes designated 16 and 17. A significant difference between the two adjustment axes 16 and 17, is that the axis 16 intersects with the spindle axis 15 and adjustment axis 17 is displaced a distance "R" from the spindle axis. In the prior art, "sweeping" or "squaring" the head is done by mounting a dial indicator 18 (FIG. B) at some radius "r" from the spindle axis and then lowering the spindle until the dial indicator makes contact with the work table. When the indicator is in contact with the work table the spindle is then manually rotated, while the operator observes the indicator. If the indicator reads the same at positions 19 and 20, the spindle axis is normal to the table. Conversely, in FIG. 1C for a spindle out-of-square, the indicator at position 19 will read a value equal to the distance P and at 20 it will read a value of $-P$. Since r is constant and more importantly the spindle axis 15 and 16 intersect, the magnitude of P and $-P$ will be identical but of opposite sign. It is intuitively obvious for an operator to simply adjust the spindle about axis 16 while sweeping the indicator between 19 and 20 until the value of P and $-P$ converge to a zero indicator reading. Practically speaking, adjustment is made until there is no change in indicator reading between 19 and 20. The features of this invention would greatly speed up the process of adjusting a spindle normal to the work table when the spindle axis 15 and the adjustment axis 16 intersect (by elimination of the sweeping process), although this example of spindle construction presents a rather simple problem.

Whereas in the aforementioned case of squaring about the axis 16, "out-of-square" indicator readings will be of equal magnitude but opposite sign; in the case about the axis 17, indicator readings become obscured by a component of spindle translation induced by reason that the spindle axis 15 and adjustment axis 17 are not in the same plane. The axes 15 and 17 are separated by a distance R which is inherent in milling machines of this type. This condition, wherein measurement of spindle perpendicularity is shrouded in indicator values that contain a translational component, is rarely understood by the machinist and invariably results in an exasperating situation for even the most experienced operator. Adjustment about the axis 17 becomes a series of trial adjustments until the operator is either lucky or just yields to a not so square spindle, i.e. good enough.

This invention provides an instrument that eliminates the translational component, thereby allowing adjustment about both axes 16 and 17 with equal simplicity. This invention further provides a unique type of displacement indicator that has been human factored to display both a coarse and fine (low and high sensitivity) displacement readout that is presented to the machinist in a viewing plane coplanar with actual spindle tilt, and further that such indicator has pointer hands that provide a magnified indication of which way the spindle is inclined.

BRIEF DESCRIPTION OF THE DRAWINGS

A preferred embodiment of the present invention is described herein, and with reference to the appended drawings, in which.

DESCRIPTION OF THE PREFERRED EMBODIMENT

Figure 1A:
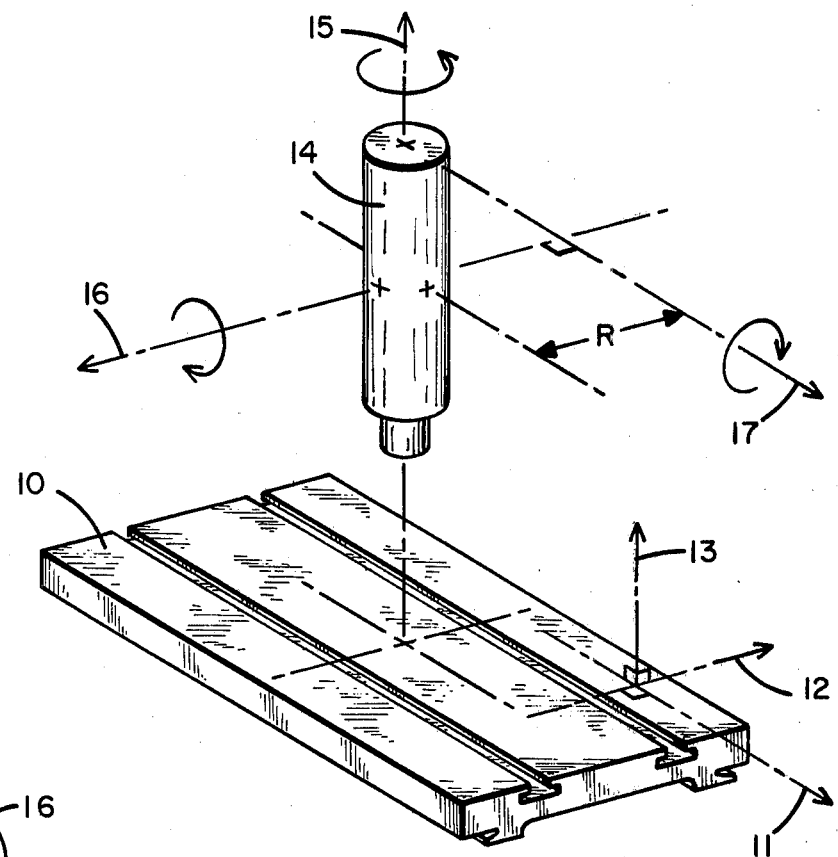
FIG. 1A is an isometric view of a vertical milling machine spindle and work table having the pertinent axes illustrated.
Figure 1B:
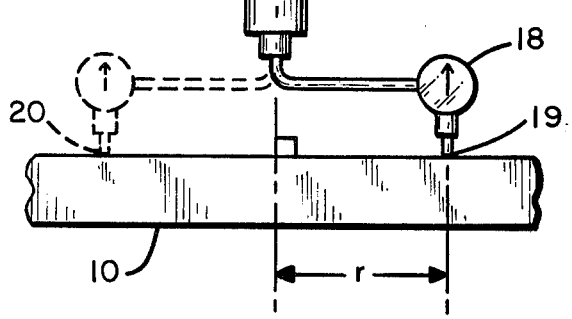
FIG. 1B illustrates a front elevation view of a vertical milling machine table and spindle with the spindle in a vertical position.
Figure 1C:
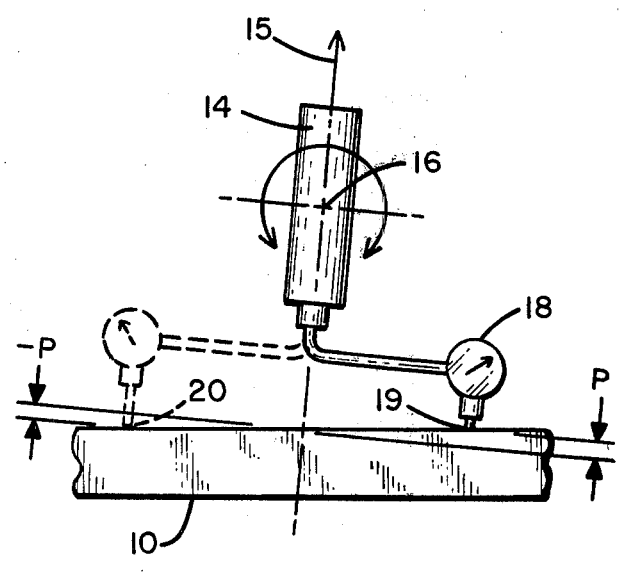
FIG. 1C illustrates a front elevation view of a vertical milling machine table and spindle with the spindle inclined to the table.
Figure 2:
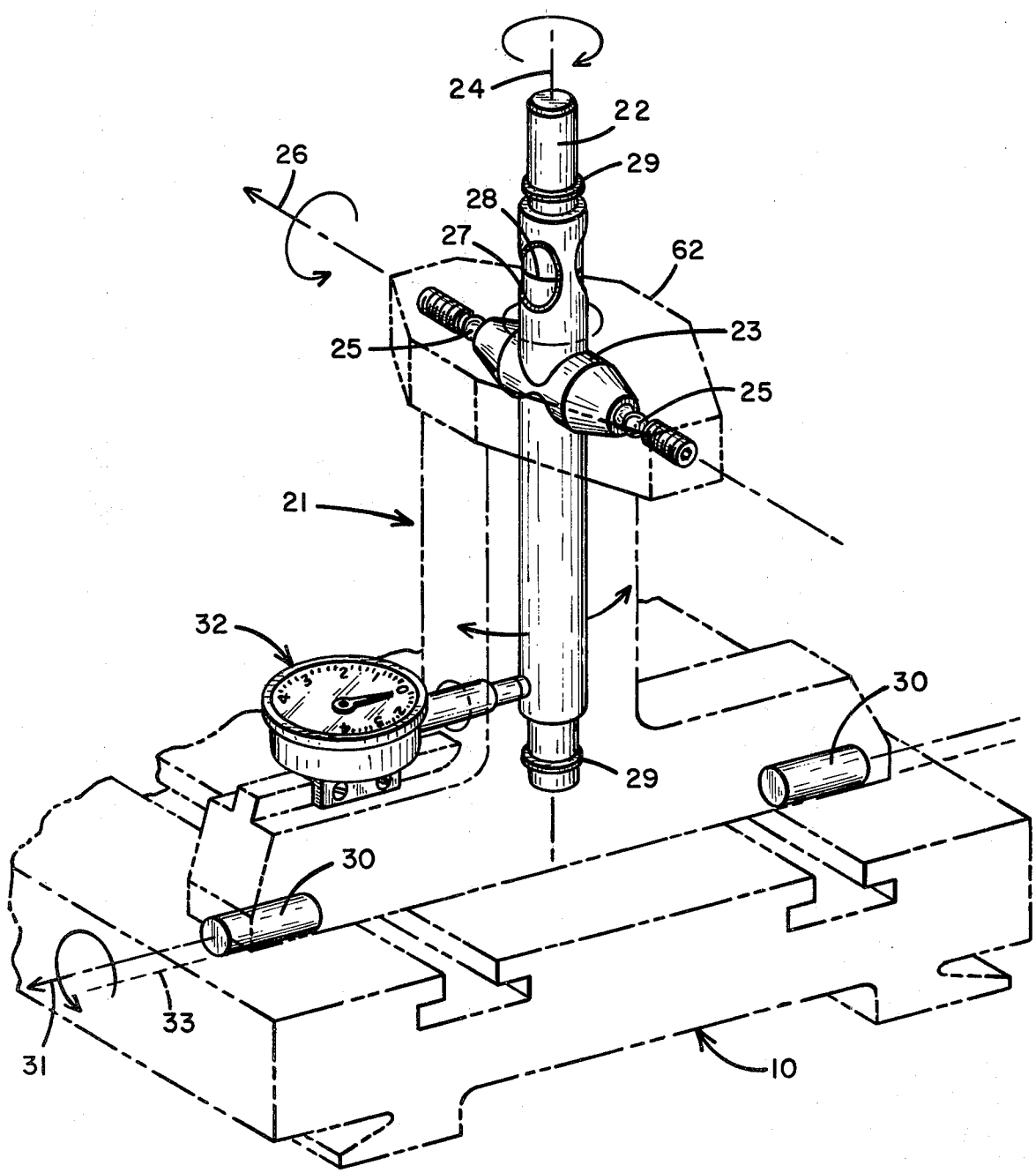
FIG. 2 is an isometric view of an improved instrument for adjusting the spindle of a vertical milling machine to be square or perpendicular with the table.

Referring to the drawings wherein like reference characters designate like or corresponding parts throughout the several views, there is shown in FIG. 2 a spindle squaring instrument generally designated 21 which embodies the principles of the instant invention. As shown, the instrument includes a right circular cylinder 22 precisely contained in a member 23 so that the right circular cylinder has rotational and axial freedom along an axis 24. The member 23 has provision for pivot bearings 25 along an axis 26 which is orthogonal but not necessarily coplanar with the axis 24. Also, the member 23 has an aperture 27 that allows a view of a circumferential witness line 28 inscribed on right circular cylinder 22. The right circular cylinder 22 has axial freedom inside element 23 by an amount equal to the width of aperture 27. Cylinder 22 is retained by snap rings 29. The subassembly comprised of the right circular cylinder 22 and pivot member 23 is contained in a main frame member 62 by the pivotal bearings 25. The main frame 62 has rigidly affixed to it, two right circular cylinders 30, said cylinders being affixed with their respective major axes coaxial along a line 31, with the plane containing the line 31 orthogonal to the respective plane or planes containing axes 24 and 26. A suitable displacement indicator 32 of the type found in the machine tool world known generically as a "dial indicator" is fixedly attached to the main frame member 62 in such a way that the indicator is able to reveal displacement between the main frame 62 and pivotal assembly 23 in a plane parallel or common to the plane defined by axes 24 and 31. The dial indicator is initially adjusted to contact the pivot assembly 23 and be displaced to a point midscale in its travel range when the axis 24 of right circular cylinder 22 is orthogonal to an element 33 of the two cylinders 30. Thenceforth any relative angular displacement between the pivot assembly 23 and mainframe 62 will be quantified by the dial indicator 32. Further, since the dial indicator, as aforementioned, is secured midscale in its travel range when the axes 24 and 31 are orthogonal, the dial indicator will respond to both acute and obtuse departures from perpendicularity of the axes 24 and 31. The right circular cylinder 22 is contained in pivotal assembly 23 such that cylinder 22 has only rotational and axial freedom and negligible radial freedom. It can be seen by reference to FIG. 2 that the dial indicator 32 will reveal movement only about axis 26 while in no way indicating translation of the cylinder 22 axially in pivotal assembly 23. A window 27 is provided in pivotal assembly 23 so that a machine operator can observe the line 28 located on right circular cylinder 22. During employment of this invention for squaring a milling machine spindle, the operator must first install and secure the right circular cylinder 22 of this invention coaxial to the milling machine spindle (typically accomplished but not limited to use of a spindle collet). Second, the operator must move the spindle to which is attached the embodiment of the instant invention to a position where the two right circular cylinders 30 contact the table along line 33. Further movement of the spindle toward the table will cause line 28 to move vertically across the field of view provided by window 27. When line 28 is nominally in the center of the field of view provided by window 27, a reading of spindle squareness can be taken from dial indicator 32. Indicator 32 will reveal values derived only from angular motion of pivotal assembly 23 about the axis 26 thereby yielding an appraisal of perpendicularity or "squareness" between the spindle axis and work table. Any subsequent angular adjustment of the machine spindle with respect to the machine work table will cause a corresponding change in readings presented by the dial indicator 32. If angular adjustment of the machine spindle includes a translational component because the machine adjustment axis 17 does not intersect with the spindle axis 15, the translatory component will be absorbed by a telescoping axial movement of right circular cylinder 22 within the pivotal assembly 23. The geometry of this invention nullifies the effect of translatory motion and will in no way produce a change in values observed on indicator 32. When an initially out of square machine spindle is adjusted to converge to a zero reading on indicator 32, such adjustment may produce translatory as well as angular movement. In this case, the witness line 28 on right circular cylinder 22 will be seen to migrate toward the upper or lower side of the window 27. If the adjustment required is of sufficiently large magnitude, the witness line 28 will be seen to move out of the field of view in window 27 and an "off scale" condition results. This migratory movement is redressed (trimmed) to the nominal midwindow position by vertical movement either of the milling machine spindle or table, a requirement being that the witness line 28 should at all times during angle adjustment be "in view" but not necessarily centered in the window 28.

Figure 3:
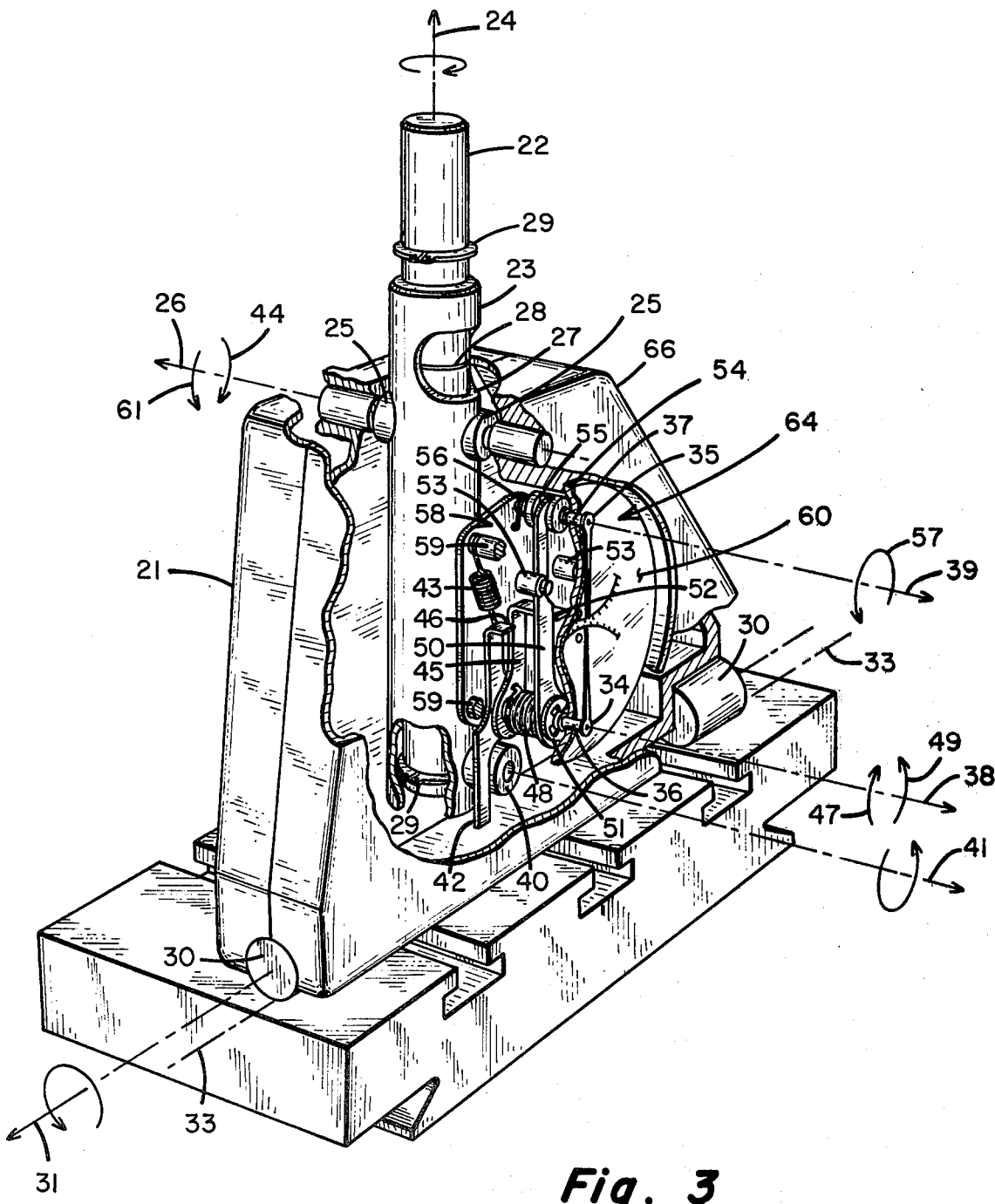
FIG. 3 is an isometric view of an improved displacement indicator for displaying spindle inclination wherein both magnitude and direction are presented in a plane coplanar with the plane of spindle tilt.
Figure 4:
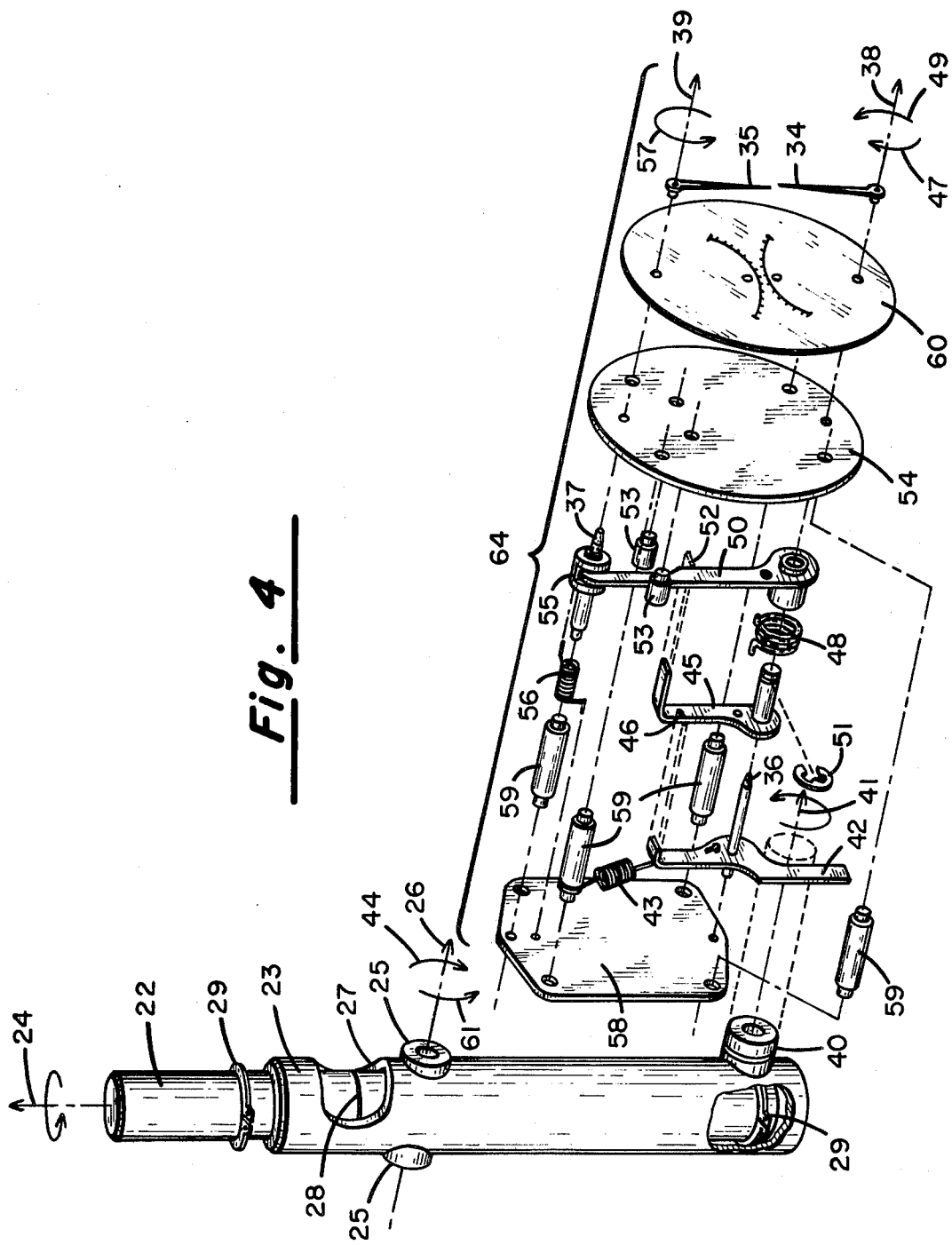
FIG. 4 is an isometric exploded view of an improved displacement indicator.

In FIG. 3 is shown an improved spindle alignment tool that embodies the spirit of this invention to include a novel displacement indicator 64 that reveals the status of spindle alignment both as to magnitude and direction. An exploded view of the indicator movement is shown in FIG. 4 wherein like parts with FIGS. 2 and 3 are similarly numbered. Since the pointers of this indicator for an out of square spindle will point in the same but magnified direction as the spindle leans, the machinist, without confusion, is immediately aware of which direction to adjust the spindle. Although this improved indicator remedies the possibility of indicator interpretation errors, the indicator is subordinate to the spirit of the geometry embodied in the foregoing separation and nullification of the translatory motion of this invention.

Indicator 64 has two pointer hands 34 and 35 attached to the indicator first pivot shaft 36 and indicator second pivot shaft 37 respectively disposed on axes 38 and 39, which axes are mutually parallel to axis 26. A cylindrical roller 40 is attached to spindle assembly 23 such that the rotational axis 41 of roller 40 is parallel to axis 26. A first lever 42 is fixedly attached to the indicator first pivot shaft 36 and caused to contact the cylindrical roller 40 at all times by spring 43. Motion of the right circular cylinder 22 in member 23 about axis 26 will cause the cylindrical roller 40 to impart rotary motion to the first lever 42, first pivot shaft 36, and pointer hand 34. If the motion of roller 40 about axis 26 is clockwise 44 it can be seen in FIG. 3 that first lever 42 will contact a second lever 45 at point 46 when the pointer 34 is nearly in a vertical position with respect to axis 31. The second lever 45 is coaxially mounted on the first pivot shaft 36 and has limited clockwise 47 rotational freedom about indicator first axis 38. Said second lever 45 is biased by coaxial spring 48 in a counter-clockwise 49 direction with respect to a third lever 50. Third lever 50 has limited rotational travel by reason of stops 53 which are affixed to the front train plate 54. Also, the third lever bears on a contact surface 55 embodied in the indicator second pivotal spindle 37. Said contact surface 55 lies in a plane that is parallel to and intersects with the second pivot shaft axis 39. Third lever 50 is maintained in contact with the surface 55 of the second pivotal shaft 37 at a point removed from the second pivotal shaft axis 39, and the contact point is on the distal side of the second pivotal shaft axis 39 with respect to the first pivotal shaft axis 38. Contact is maintained between third lever 50 and the contact surface 55 of second pivotal shaft 37 by a preloaded coaxial spring 56 that reacts counterclockwise 57 between pivotal shaft 37 and the displacement meter rear train plate 58. The rear train plate 58 is rigidly attached to the front train plate 54 by the separator posts 59. Said front train plate 54 has affixed to it an appropriate dial plate 60 on which are inscribed scales to quantify the positions of the dial pointers 34 and 35. The displacement indicator assembly is fixedly attached to the spindle squaring device main frame 66.

In operation, it can be seen that for a milling machine spindle that is out-of-square in a counterclockwise direction, the spindle assembly 23 of this invention will also be moved accordingly counterclockwise 61 about axis 26. Since the cylindrical roller 40 is affixed to the pivotal spindle assembly 23, it too will therefore be moved to a counterclockwise position. Because the bias spring 43 maintains contact between first lever 42 and cylindric roller 40, the first lever 42 will rotate counterclockwise 49 about the indicator first pivot shaft axis 38. Owing to the operating geometry of the levers, the pointer 34 which is attached to the indicator first pivot shaft 36 will move counterclockwise 49 through an angle that bears a magnified but similar indication of the direction of milling machine spindle tilt.

Referring to the conditions prevailing with the indicator second pivotal shaft 37 during the aforementioned condition of a "hard over" counterclockwise condition of the milling machine spindle, it can be seen that the preloaded coaxial spring 56 on the indicator second pivotal shaft 37 will cause the second pivotal shaft to also rotate counterclockwise 57. Since the said second pivotal shaft 37 is in maintained contact with the indicator third lever 50 at surface 55, the stored energy in the indicator second pivotal shaft coaxial spring 56 will move the freely floating third lever 50 counterclockwise about the indicator first pivotal axis 38 until restrained by the limit stop 53. The indicator second pivotal shaft pointer 35 will be disposed in a full scale "hard over" counterclockwise 57 position with respect to the indicator dial plate 60. Since the indicator first pivot shaft 36 is displaced counterclockwise 49 to a position that is a modest amplification of the amount of milling machine spindle tilt in a counterclockwise direction and the high sensitivity indicator second pointer 35 is also in a full scale counterclockwise position, there can be no confusion to the machine operator about which way the milling machine spindle is tilted or out-of-square. As the milling machine spindle is adjusted towards vertical or square in a clockwise direction, the spindle pivotal assembly 23 will move clockwise 44 about axis 26 and the cylindric roller 40 will cause the indicator first lever 42 to move clockwise about the indicator first pivot axis 38 and the first pivot shaft pointer 34 will be caused to move clockwise 47 towards a vertical or center scale position on the dial plate. As the first pivotal axis pointer 34 approaches vertical in a clockwise 47 direction, but is not quite vertical or center scale, an angulated tang on the indicator first lever 42 makes contact with the indicator second lever 45 at a point 46. Second lever 45 is in strict maintained contact with the indicator third lever 50 by an angulated tang on the second lever 45 at a point 52 under the preload action of coaxial spring 48. As the first indicator lever 42 advances in a clockwise direction 47 into contact with the indicator second lever 45 there is sufficient acting preload in coaxial spring 48 to cause both the indicator second lever 45 and indicator third lever 50 to move together as a rigid pair on a clockwise direction 47 about axis 38 and further to cause the indicator second pivotal shaft 37 and its attached pointer 35 to commence movement in a magnified clockwise direction. The pointers 34 and 35 of this instant invention can be so calibrated that said pointers will coincide on a straight vertical line with respect to each other at the same positional instant that the spindle assembly (which is coaxially affixed to the milling machine spindle) is normal to the axes of right circular cylinders 30 which are in contact with the milling machine table along an element or line 33.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An instrument for measuring and squaring the spindle and collet of a vertical milling machine to be perpendicular with the machine table or work surface comprising
   (a) a first cylinder member adapted for securing along an axis coaxial to said spindle with said collet, having a portion thereof protruding from said collet;
   (b) a pivotal second member that contains a portion of said first member which protrudes from said collet, said second member having rotational and axial freedom relative to said first member and with negligible radial clearance about said first member, and said second member having a pivotal axis which is perpendicular to the axis of said first member;
   (c) a main frame which supports said second member along said pivotal axis of said second member, said main frame having at least two surface contact points along a line that defines an axis which is perpendicular to said pivotal axis of said second member; and
   (d) an indicator affixed between said main frame and said pivotal second member to quantify relative motion about said pivotal axis of said second member.

2. The apparatus of claim 1, wherein said pivotal second member further comprises a viewing aperture which provides visibility of a portion of said first cylinder member.

3. The apparatus of claim 2 wherein said first cylinder member further comprises axial retaining means for allowing axial movement of said first cylinder member over a limited axial distance.

4. The apparatus of claim 1 wherein said indicator further comprises an indicator dial having a face plane parallel to both said first cylinder member axis, and to said axis defined by said main frame two surface contact points.

5. The apparatus of claim 1 further comprising a cylindrical roller affixed to said pivotal second member, having an axis parallel to said pivotal axis of said pivotal second member.

6. The apparatus of claim 5 further comprising a first and second indicator shaft, each respectively having affixed thereon a first and second pointer, said indicator shafts having mutually parallel axes and being parallel to the axis of said cylindrical roller.

7. The apparatus of claim 6 further comprising an indicator first lever fixedly attached to said first indicator shaft, and a biasing spring holding said first lever in maintained contact with said cylindrical roller.

8. The apparatus of claim 7 further comprising indicator second and third levers respectively retained with suitable bearings on said first indicator shaft, a preloaded first torsion spring located between said second and third levers about said first indicator shaft, said indicator second lever having an angulated tang held in rotational contact against said indicator third lever.

9. The apparatus of claim 8 further comprising a preloaded second torsion spring located coaxially on said second indicator shaft; a contact surface on said second indicator shaft; said second torsion spring holding said indicator third lever against said contact surface.

10. The apparatus of claim 9 wherein the second indicator shaft contact surface further comprises a surface lying in a plane that intersects the axis of said second indicator shaft and further that said plane intersects the axis of said first indicator shaft when said indicator first and second pointers are in an aligned position.

11. The apparatus of claim 10 wherein the point of contact between said indicator third lever and said second indicator shaft contact surface is displaced off the axis of said second indicator shaft to a location that is on the distal side of said second indicator axis with respect to the first indicator axis.

* * * * *